Oct. 6, 1970              I. J. DAVIS              3,532,574
METHOD FOR THE APPLICATION OF FRIABLE, PRESSURE
SENSITIVE ADHESIVE COATED LAMINATES
Filed June 22, 1966
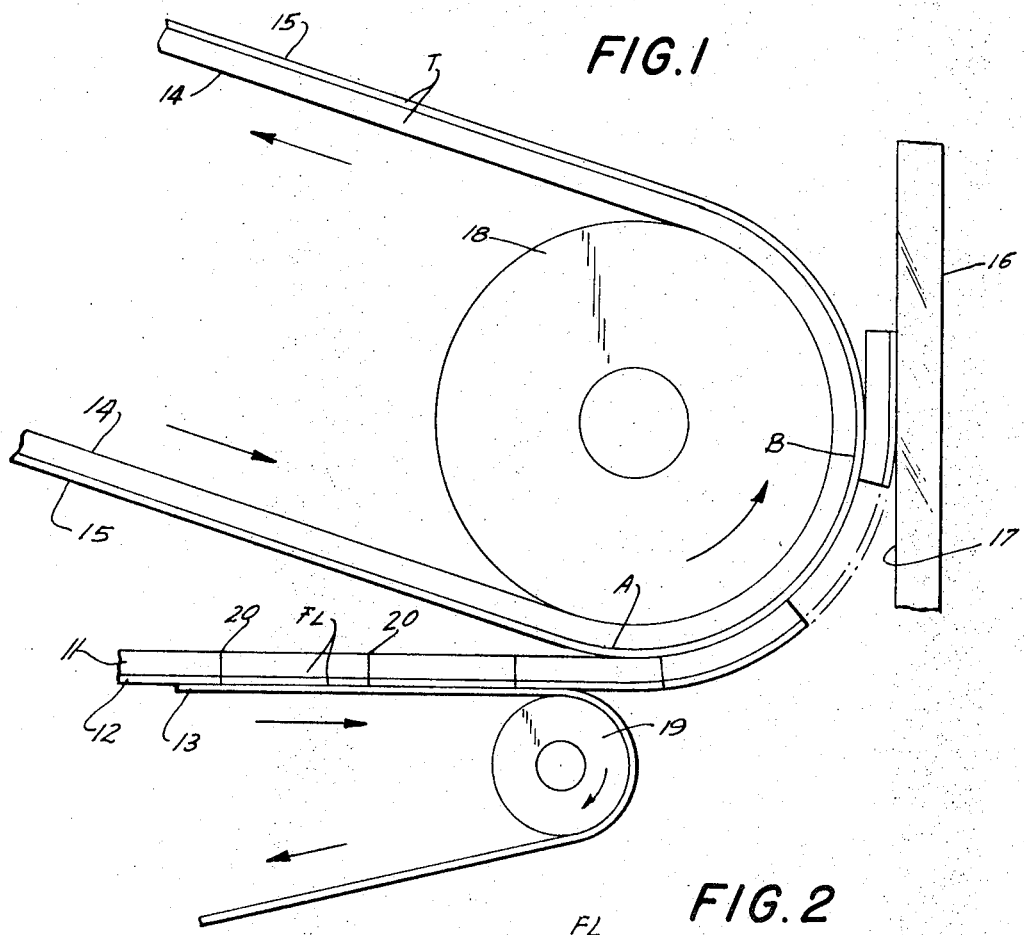
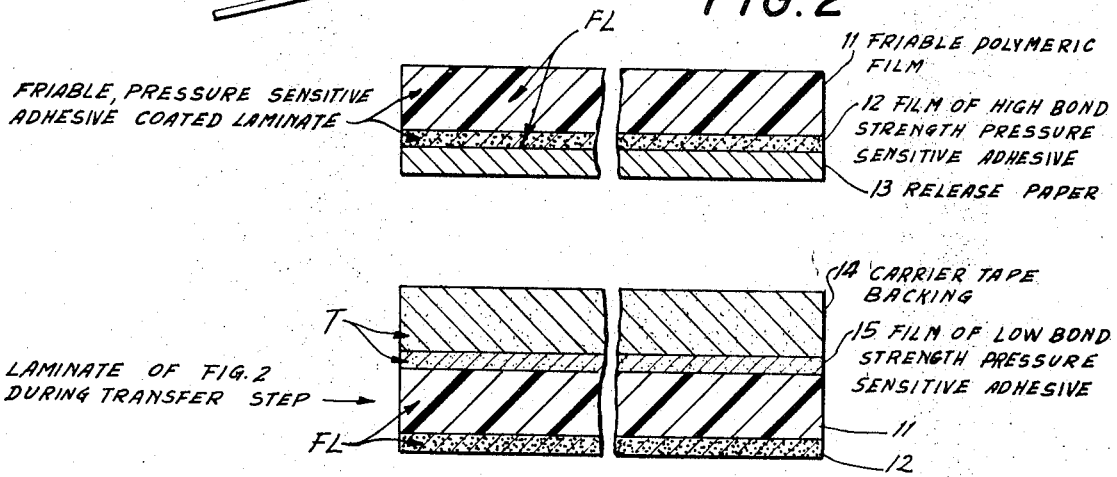
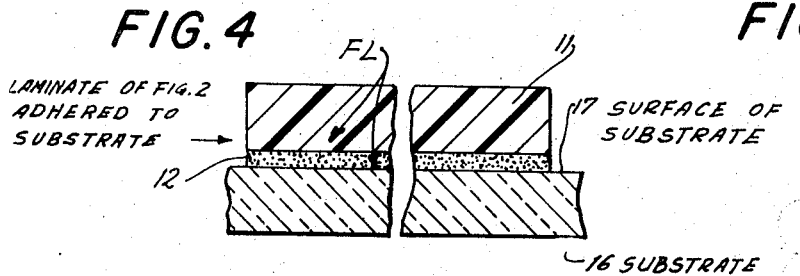
INVENTOR
IRWIN J. DAVIS
BY
ATTORNEY United States Patent Office 3,532,574
Patented Oct. 6, 1970

3,532,574
METHOD FOR THE APPLICATION OF FRIABLE, PRESSURE SENSITIVE ADHESIVE COATED LAMINATES
Irwin J. Davis, Plainfield, N.J., assignor, by mesne assignments, to Compac Corporation, New York, N.Y., a corporation of Delaware (in c/o Laird Industries Inc.)
Filed June 22, 1966, Ser. No. 559,575
Int. Cl. B44c 1/16
U.S. Cl. 156—238                    7 Claims

ABSTRACT OF THE DISCLOSURE

A method for the dispensing and subsequent application of friable, flexible, pressure sensitive adhesive coated laminates, in which such laminates may be rapidly dispensed and thereupon adhered to a solid substrate without rupturing or tearing or otherwise damaging the friable, pressure sensitive adhesive coated laminates.

---

This invention relates to a novel method for the application of friable, pressure sensitive adhesive coated laminates to the surface of solid substrates as well as to the apparatus for accomplishing such application.

It is the prime object of this invention to provide a method for the dispensing and subsequent application of friable, flexible, pressure sensitive adhesive coated laminates; said method permitting such laminates to be rapidly dispensed and, thereupon, adhered to a selected solid substrate without prematurely rupturing or otherwise damaging the friable laminate. It is a further object to provide suitable apparatus for rapidly and efficiently effecting such transfer and adhesion.

For many industrial and consumer applications, there is a need for a type of thin, friable laminate structure which is coated on one surface thereof with a pressure sensitive adhesive. The extreme fragility of such friable laminates is particularly desirable in applications wherein it is necessary to provide a so-called "tamperproof" decal or label which, by rupturing, will readily reveal when any attempts have been made to remove it from the substrate to which it has been adhered. Typical examples of such friable laminates may be found in our copending applications Ser. No. 379,504, filed July 1, 1964, and Ser. No. 471,904, filed July 14, 1965, now abandoned, both applications being assigned to the assignee of the subject application. It should be noted that when reference is made to the term "friable," for purposes of this invention, it is meant to describe laminates which are exceedingly fragile and/or exceedingly flexible to the extent that, when handled, they are readily torn or otherwise damaged.

It is this very desirable combination of flexibility and/or fragility which has been found to be primarily responsible for the difficulties which have been encountered in dispensing and applying these pressure sensitive adhesive coated laminates onto the surface of solid substrates. Present methods for applying pressure sensitive adhesive coated laminates depend upon a certain degree of strength and rigidity being present in the laminate so as to permit the necessary application of force and pressure to such laminates while nonetheless avoiding their unintentional rupture. When these methods are applied to friable laminates, however, the force or pressure ordinarily utilized results in tearing and/or rupturing of the fragile films as well as increased adhesion to the release paper which therefore causes greater difficulty in its removal therefrom.

The process of this invention is, therefore, intended to overcome the latter deficiencies inherent in the means now available for applying such friable, pressure sensitive adhesive coated laminates.

The invention relates more specifically to a method and apparatus for applying such friable laminates as hereinafter defined in the appended claims read together with the following description thereof and the accompanying drawings, in which:

FIG. 1 is a schematic view illustrating the novel method of this invention as well as a particular apparatus for conducting such method;

FIG. 2 is a cross-sectional view of the friable, pressure sensitive adhesive coated laminate in a condition prior to its application to the surface of a substrate;

FIG. 3 is a cross-sectional view of the laminate subsequent to its having been brought into intimate contact with a carrying tape therefor; and FIG. 4 is a cross-sectional view of the friable laminate upon its ultimate adhesion to a surface of a solid substrate.

Referring, now, in more detail to the drawing, FIG. 1 illustrates a particular apparatus which may be utilized in carrying out the novel process of this invention. Thus, a carrier tape T comprising a suitable film backing 14 having adhered thereto a film 15 of low bond strength pressure sensitive adhesive, is brought into contact, at Point A, with a friable, pressure sensitive adhesive coated laminate FL which comprises a friable polymeric film 11 and a film of high bond strength pressure sensitive adhesive 12 adhered thereto on a sheet of release paper 13, which latter serves to protect the surface of said adhesive. The friable laminate FL attached to the release paper 13 is depicted in FIG. 2. Contact between the carrier tape T and the friable laminate FL is made in such a manner that the surface of the pressure sensitive adhesive film 15 of said carrier tape T is in face-to-face adhering contact with the friable polymeric film 11 of said friable laminate FL.

At this point, the release paper 13, is detached from the film of the high bond strength pressure sensitive adhesive 12 of the friable laminate simultaneously with the adherence of the film 11 to the low bond strength pressure sensitive adhesive 15, and is removed from the system. The resulting 4-ply assembly 11, 12, 14, 15, which comprises the carrier tape backing 14, the film of low bond strength pressure sensitive adhesive 15, the friable polymeric film 11, and the film of high bond strength pressure sensitive adhesive 12, as separately depicted in FIG. 3, is then moved toward the surface 17 of the solid substrate 16 to which the friable laminate FL 11, 12 is to be adhered.

At Point B, either the entire 4-ply assembly 11, 12, 14, 15 is moved towards the surface 17 of the solid substrate 16 or, conversely, the latter solid substrate 16 is moved towards the outer surface 12 of the 4-ply assembly 11, 12, 14, 15 so that in either case the surface 17 of the solid substrate 16 forms a permanent adhesive bond with the surface 12 of the friable laminate FL simultaneously with the breaking of the temporary adhesive bond between the low bond strength pressure sensitive adhesive coated carrier tape T and the surface of said friable polymeric film 11. The resulting adhesive bond between the high bond strength pressure sensitive adhesive coated friable polymeric film 11, and 12 and the solid substrate 16 is depicted in FIG. 4.

The essential aspect of the process of this invention resides in the fact that the strength of the adhesive bond between the low bond strength pressure sensitive adhesive film 15 of said carrier tape T and the surface of the friable polymeric film 11 of said friable laminate FL must be less than the strength of the adhesive bond which is subsequently formed between the high bond strength pressure sensitive adhesive film 12 of the friable laminate FL and the surface 17 of the solid substrate 16, thus insuring the ready separability of the friable laminate parts 11, 12 from the carrier tape parts 14, 15 at the instant of adhesion of said laminate parts 11, 12 to the substrate 16. A second essential aspect of this process is that the strength of the adhesive bond between the low bond strength pressure sensitive adhesive film 15 of said carrier tape parts 14, 15 and the friable polymeric film 11 of said friable laminate parts 11, 12 must be greater than the strength of the adhesive bond between the release paper 13 and the pressure sensitive adhesive coating 12 of said friable polymeric film 11, thus insuring the simultaneous delamination of the release paper 13 from the friable laminate parts 11, 12 and the transfer of the latter laminate parts 11, 12 in a form whereby it can be readily adhered to the carrier tap parts 14, 15 and subsequently to the solid substrate 16. Furthermore, the tensile strength, at the breaking point, of the friable polymeric film 11 of said friable laminate parts 11, 12 should be greater than the strength of the adhesive bond between the low bond strenth pressure sensitive adhesive film 15 of said carrier tape parts 14, 15 and the friable polymeric film 11 so as to permit said friable polymeric film 11 to remain intact during the transfer procedure. Only if these requirements are fulfilled is it then possible for the process of this invention to function effectively.

In brief, therefore, this process comprises the use of a carrier tape T (14, 15) which is capable of adhering to a friable, pressure sensitive adhesive coated laminate FL (11, 12) while simultaneously being able to remove the release paper 13 from the adhesive surface 12 of said friable laminate, of thereupon conveying said laminate FL and, subsequently, of adhering it to the surface 17 of its intended solid substrate 16 and breaking the adhesive bond between the friable polymeric film 11 and the low bond strength pressure sensitive adhesive film 15 of the carrier tape 14, 15; the entire operation being accomplished without rupturing or otherwise damaging the friable laminate parts 11, 12.

It is, thus, necessary that the low bond strength adhesive film 15 which is utilized on the carrier tape backing 14 be an adhesive which has sufficient strength to adhere to the friable laminate parts 11, 12 while being weak enough so as to readily break the latter adhesive bond with said friable laminate 11, 12 as soon as the adhesive film 12 of said laminate 11, 12 is adhered to the surface 17 of its intended substrate 16. In those cases where the bond strength of the adhesive selected for the carrier tape does not meet the stated requirements, the practitioner faces the prospect of premature rupturing of the friable film laminate as well as its inefficient transfer and adhesion.

Determination of "peel adhesion" of the various adhesive bonds will provide the practitioner with a more quantitative method for choosing the respective pressure sensitive adhesives. Thus, if the peel strength of the pressure sensitive adhesive utilized for the friable laminate exceeds that of the pressure sensitive adhesive utilized for the carrier tape by a ratio of at least about 4:1, it is virtually certain that a proper choice has been made. This peel adhesion procedure is generally performed by adhering the desired pressure sensitive adhesive coated laminate to a stainless steel plate so that a one inch section at one end of the strip remains free and unadhered. To the latter free end of the adhesive coated polymer film there is adhered a 1" x 3" leader made of polyethylene glycol terephthalate having a thickness of 1.0 mils. This leader is clamped into the upper jaw of an Instron Tester while the steel plate is clamped within the lower jaw in such a manner as to attain an angle of 180° between the strip of the adhesive coated polymer film and the surface of the steel plate. The device is then allowed to operate so that the jaws are moved apart from one another at a constant speed of 12 inches per minute until the point at which the adhesive coated film pulls free from the surface of the steel plate whereupon the strength of the adhesive bond, in ounces per linear inch, is recorded. The entire procedure is conducted quite rapidly in order to simulate the rapid transfer conditions which are encountered in the actual operation of the process of this invention. It should be further noted that as a result of the fragile nature of the polymer film, it may be necessary to provide a sturdier backing for such laminates when subjecting them to the above described peel adhesion test.

As for the applicable carrier tapes which may be utilized in the process of this invention, they may comprise a solid backing consisting of a sturdy cellulosic or polymeric film material including, for example, paper, rubber saturated paper, polyethylene glycol terephthalate, and cellophane, etc., which is coated with a low bond strength pressure sensitive adhesive which may be based upon such elastomeric materials as: butyl rubber, natural rubber, polyisobutylene, polyvinyl ethers, and long chain acrylate esters. As will be subsequently noted, the basic elastomeric materials utilized in the pressure sensitive adhesives which are applied to the carrier tapes can also be utilized as the adhesive component of the friable polymeric films. This is permissible because the required difference in the adhesive characteristics of the respective pressure sensitive adhesives is ordinarily achieved by proper formulation of the basic elastomeric materials. Thus, for example, the use of tackifiers which consist, primarily, of liquid or low melting resins enables the practitioner to formulate low bond strength pressure sensitive adhesives which are ideal for use on the carrier tapes. In contrast, the utilization of solid or high melting resins enables the practitioner to formlulate high bond strength pressure sensitive adhesives which may be properly used on the friable polymeric films. Other factors such as the concentration of ingredients and the rate of application also enables the practitioner to carefully control the adhesive characteristics.

As for the friable laminates which may be dispensed and applied by means of the process of this invention, their fragile and/or flexible polymeric films may be prepared from such polymeric materials as: (1) the polymers of the lower alkyl, i.e. $C_1$–$C_4$, acrylate esters which include, for example, polymethyl methacrylate, polyethyl methacrylate, polyethyl acrylate, polybutyl acrylate, and polybutyl methacrylate as well as copolymers of any two, or more, of these lower alkyl acrylate esters with one another or with minor amounts of one or more ethylenically unsaturated, i.e. vinyl, comonomers such as vinyl acetate, vinyl chloride, styrene, acrylonitrile, and the lower alkyl esters of maleic and fumaric acids; (2) polyvinyl chloride and copolymers of vinyl chloride with one or more ethylenically unsaturated comonomers such as vinyl acetate and the lower alkyl esters of maleic and fumaric acids; and, (3) ethers and esters of cellulose such as ethyl cellulose, cellulose butyrate, nitrocellulose, cellulose acetate, and cellulose triacetate.

These fims are then used in conjunction with tacky, high bond strength, pressure sensitive adhesives based upon any elastomeric material such as: (1) natural rubber; (2) synthetic rubbers including, for example, styrene-butadiene copolymers, polyisobutylene, butadiene-acrylonitrile copolymers, polychloroprene, and polyisoprene; (3) elastomeric copolymers containing at least 50%, by weight, of a $C_4$–$C_{12}$ alkyl acrylate ester, i.e. an alkyl acrylate ester wherein the alkyl group contains from 4 to 12 carbon atoms, together with a hardening comonomer selected from the group consisting of vinyl acetate, styrene, methyl methacrylate, ethyl methacrylate, and vinyl chloride; and, (4) elastomeric polymers of alkyl vinyl ethers such, for example, as polymethyl vinyl ether and polyethyl vinyl ether.

A high release type silicone coated paper sheet, which is adhered to the pressure sensitive adhesive coated polymeric film, is preferably used as the release paper. Representative types of paper that may be thus silicone coated and utilized as release sheets include 40 to 60 pound kraft, and glassine or clay coated kraft, etc.

As previously noted, FIG. 1 represents a typical apparatus which may be used to effectuate the novel process of this invention. Thus, a rotating drum 18 is utilized to bring the carrier tape T into contact with the friable laminate FL; said drum thereupon transferring the resulting 4-ply assembly 11, 12, 14, 15 to the surface 17 of the solid substrate 16 to which the friable laminate is to be adhered and, finally, functioning to remove the surplus carrier tape T. A second rotating drum 19 is utilized to convey the friable laminate FL and the release paper 13 to the point of contact, i.e. Point A, with the carrier tape T and, thereafter, to remove the release paper 13. It should be noted that it is desirable that the drums which are utilized in the above described apparatus should be made of moderately firm rubber in order to provide the resiliency which is required to cushion and protect the friable laminates.

In practice, the friable polymeric laminate FL will usually be in the form of discrete, segmented sections which sections may, thus, be individually applied to a substrate 16. The adjacent ends of the segmented sections of the laminate may be in intimate contact with one another as positioned on the surface of the release paper 13. Such an arrangement is shown in FIG. 1 wherein the adjacent ends 20 of the respective segments of the laminate are depicted.

The latter embodiment which comprises a system utilizing rotating drums is not meant, however, to preclude the use of other mechanical systems which may, of course, perform the same functions in different ways. Thus, various types of belt and gear systems, etc., may be efficiently utilized as a substitute for the rotating drums.

The particular system which is utilized may be of a simple nature or, if desired, it may provide a more sophisticated and elaborate approach to the problem. Such an approach might include, for example, the use in the apparatus of FIG. 1 of a vertically oscillating drum in order to remove the release paper, thus simultaneously providing some spacing between adjacent, lateral sections of the friable laminate as would, necessarily, be required in a commercial operation in which individual decals or labels are being removed from a roll and adhered to individual substrates.

By way of specific illustration of the novel process of this invention, the system depicted in FIG. 1 was utilized in conjunction with a carrier tape which comprised a rubber saturated paper backing and a 1.2 mil dry coating of a pressure sensitive adhesive based on polyisobutylene tackified with a low melting point terpene resin. The fragile laminate which was transferred and adhered comprised a polyethyl methacrylate film, having a thickness of 1.75 mils and a tensile strength, at the breaking point, of 40 ounces per linear inch; a 1.0 mil dry coating of an acrylic based pressure sensitive adhesive; and, a silicone coated release sheet prepared from 50 lb. kraft paper.

Peel adhesion tests were run on both pressure sensitive adhesives, utilizing the procedure hereinbefore described. The peel strength of the bond formed between the pressure sensitive adhesive coating on the friable polymeric film and the release paper was 0.72 ounce per linear inch. The polyisobutylene based pressure sensitive adhesive of the carrier tape showed a peel strength of 4.2 ounces per linear inch in comparison with a peel strength of 36.7 ounces per linear inch for the acrylic based pressure sensitive adhesive utilized in the friable laminate. The relationship of the relative values, i.e. the six-fold peel strength superiority shown by the low bond strength pressure sensitive adhesive when compared to the bond formed between the release paper and the adhesive coating on the friable polymeric film as well as the nine-fold peel strength superiority of the adhesive utilized in the friable laminate over that used in the carrier tape, was indicative of adhesive systems which could satisfactorily be used in the process of this invention.

In actual use, the carrier tape T was brought into contact with the polymeric laminate FL at Point A, as depicted in FIG. 1, whereupon the laminate readily adhered to the carrier tape simultaneous with the delamination of the release sheet 13 from the friable, polymeric laminate FL. The resulting 4-ply assembly was then transferred, by the rotating drum, to the surface of a glass jar 16. Upon making contact with the surface of the jar, the pressure sensitive adhesive coated polymeric film 12 formed a permanent bond therewith while the adhesive bond between the carrier tape T and the friable laminate was readily broken upon the removal of the carrier tape. An inspection of the surface of the adhered polymeric film 11 revealed that its surface was completely intact and devoid of any tears or breaks thus indicating that it had been efficiently and effectively transferred and adhered.

Summarizing, this invention is seen to provide a novel process for applying friable and flexible pressure sensitive adhesive coated polymeric films as well as to provide a means for implementing the process. Variations may be made in procedures and materials without departing from the scope of this invention which is defined by the following claims.

I claim:

1. A method for transferring and adhering a friable, pressure sensitive adhesive coated laminate to the surface of a solid substrate in a manner such that said friable laminate remains intact during said transfer and adhesion operations; said friable, pressure sensitive adhesive coated laminate comprising a two-ply assembly of a friable polymeric film coated on one surface with a high bond strength pressure sensitive adhesive; said method comprising the steps of:
   (1) providing said friable, pressure sensitive adhesive coated laminate;
   (2) contacting said friable laminate with a two-ply carrier tape comprised of a solid film backing coated on one surface thereof with a low bond strength pressure sensitive adhesive, the contact between said carrier tape and said friable laminate being such that the friable polymeric film of said laminate is in face-to-face adhered contact with the low bond strength pressure sensitive adhesive of said carrier tape;
   (3) thereupon conveying the resulting four-ply assembly to the surface of a solid substrate to which said friable laminate is to be adhered;
   (4) adhering the high bond strength pressure sensitive adhesive coated surface of said friable laminate to the surface of said solid substrate to produce a permanent adhesive bond between the surface of said solid substrate and the adhesive coated surface of said friable laminate and simultaneously breaking the temporary adhesive bond between the adhesive coated surface of said carrier tape and the friable polymeric film of said friable laminate, and removing said carrier tape from the friable laminate.

2. The method of claim 1, wherein the peel strength ratio of said high bond strength pressure sensitive adhesive to said low bond strength pressure sensitive adhesive is at least about 4:1.

3. The method of claim 1, wherein a release sheet is initially adhered to the adhesive coated surface of said friable laminate and is, thereafter, removed simultaneously with the adhesion of the friable laminate to the adhesive coated surface of said carrier tape.

4. A method for the transfer and adhesion of a friable, pressure sensitive adhesive coated laminate to the surface of a solid substrate in a manner such that said friable laminate remains intact during the transfer and adhesion of said friable laminate to the surface of the solid substrate; said friable, pressure sensitive adhesive coated laminate comprising a two-ply assembly of a friable polymeric film coated on one surface with a high bond strength pressure sensitive adhesive; an associated carrier tape comprised of a two-ply assembly of a solid film backing coated on one surface thereof with a low bond strength pressure sensitive adhesive, said low bond strength pressure sensitive adhesive being an adhesive having a bond strength between its film backing and the friable polymeric film of said friable laminate which is:

(A) greater than the strength of the adhesive bond which exists between the high bond strength pressure sensitive adhesive film of said friable laminate and a release sheet attached thereto; and, (B) less than the strength of the adhesive bond which exists between the high bond strength pressure sensitive adhesive film of said friable laminate and the surface of said solid substrate;

said method comprising:

(1) adhering the said carrier tape to said friable laminate thereby producing a resulting four-ply assembly while the release sheet which is present upon the adhesive coated surface of said friable laminate is simultaneously removed therefrom; and, (2) of, subsequently, transferring and adhering said friable laminate to the surface of said solid substrate while simultaneously breaking the adhesive bond between the low bond strength pressure sensitive adhesive coated surface of said carrier tape and the friable polymeric film of said friable laminate.

5. The method of claim 4, wherein the peel strength ratio of said high bond strength pressure sensitive adhesive to said low bond strength pressure sensitive adhesive coated on one surface of said carrier tape is at least about 4:1.

6. The method of claim 4, wherein a rotary member is utilized:

(1) to make contact and adhere the low bond strength pressure sensitive adhesive surface of said carrier tape to the friable polymeric film of said friable laminate;

(2) to convey to the surface of said solid substrate, the said resulting four-ply assembly;

(3) to adhere the adhesive coated surface of said friable laminate to the surface of said solid substrate and to simultaneously break the temporary adhesive bond between the adhesive coated surface of said carrier tape and the friable polymeric film of said friable laminate; and (4) to permit removal of the residual carrier tape from the friable film surface of said friable laminate.

7. The method of claim 6, wherein a second rotary member is utilized in conjunction with said first mentioned rotary member:

(1) to position said friable laminate in such a manner whereby it makes face-to-face contact with the adhesive coated surface of said carrier tape; and (2) to permit removal of the residual release paper from the adhesive coated surface of said friable laminate.

References Cited

UNITED STATES PATENTS

| | | | |
|---|---|---|---|
| 3,065,120 | 11/1962 | Avelar | 161—406 X |
| 2,556,078 | 6/1951 | Francis | 156—238 |
| 2,567,186 | 9/1951 | Cross et al. | 156—238 |
| 3,379,604 | 4/1968 | Weber et al. | 156—249 X |
| 3,405,021 | 10/1968 | Marano | 156—542 X |

JOHN T. GOOLKASIAN, Primary Examiner

R. A. KILLWORTH, Assistant Examiner

U.S. Cl. X.R.

156—239, 240; 161—406